United States Patent [19]
Horner et al.

[11] Patent Number: 5,357,544
[45] Date of Patent: Oct. 18, 1994

[54] DEVICES, SYSTEMS, AND METHODS FOR COMPOSITE SIGNAL DECODING

[75] Inventors: Thomas G. Horner, Rockwall, Tex.; Robert E. Christensen, Medford, Mass.; Alireza Lovrich, Houston, Tex.

[73] Assignee: Texas Instruments, Incorporated, Dallas, Tex.

[21] Appl. No.: 918,189

[22] Filed: Jul. 21, 1992

[51] Int. Cl.$^5$ .............................................. H04L 27/06
[52] U.S. Cl. .......................................... 375/94; 381/7; 364/724.1
[58] Field of Search ................. 381/7, 4, 2, 3; 331/25, 331/20; 375/94, 39, 113; 329/341; 364/724.1

[56] References Cited

U.S. PATENT DOCUMENTS

| | | | |
|---|---|---|---|
| 4,334,125 | 6/1982 | Inoue | 381/7 |
| 4,688,253 | 8/1987 | Gumm | 381/7 |
| 4,723,288 | 2/1988 | Borth et al. | 381/7 |
| 5,222,144 | 6/1993 | Whikehart | 375/94 |
| 5,239,585 | 8/1993 | Restle | 381/7 |

*Primary Examiner*—Stephen Chin
*Assistant Examiner*—Hai H. Phan
*Attorney, Agent, or Firm*—Scott B. Stahl; James C. Kesterson; Richard L. Donaldson

[57] ABSTRACT

A method is provided for decoding a composite signal which includes receiving a composite signal including a pilot signal at a pilot signal frequency, and first and second information modulated with a subcarrier at a harmonic of the pilot frequency. The composite signal is sampled at a preselected sampling frequency. The sampled composite signal is mixed down with a reference signal of approximately the same frequency. The mixed down pilot signal is extracted from the mixed down composite signal, the amplitude and sign of the mixed down pilot signal proportional to the phase difference between the pilot signal and the reference signal. The phase of the reference signal is adjusted as a function of the amplitude and sign of the mixed down pilot signal such that the reference signal is approximately 90° out of phase with the received pilot signal. The sample of the composite signal taken closest to the start of a period of the pilot signal is identified. Samples representing substantially the first and second information from the digitized composite signal are selected by selecting those samples of the digitized composite signal taken at point in time when the sine of the phase angle of the composite signal is substantially plus and minus one, the point in time determined from the sampling frequency and the samples of the composite signal taken closest to the start of each period of the pilot signal.

20 Claims, 9 Drawing Sheets

DEVICES, SYSTEMS, AND METHODS FOR COMPOSITE SIGNAL DECODING

TECHNICAL FIELD OF THE INVENTION

This invention generally relates to devices, systems and methods for decoding a composite signal.

BACKGROUND OF THE INVENTION

Without limiting the scope of the invention, its background is described in connection with a scheme for decoding a composite frequency modulation (FM) stereo signals, as an example.

A composite FM Stereo signal is of the form:

$$fm(t) = [l(t)+r(t)] + A_p \sin(\omega_p t) + [l(t)-r(t)] \sin(2\omega_p t) \quad (1)$$

where:
 fm(t) is the time varying value of the composite signal;
 l(t) is the time varying value of the left channel signal;
 r(t) is the time varying value of the right channel signal;
 $A_p$ is the amplitude of the 19 Khz pilot signal;
 $\omega_p$ is the pilot frequency of $2\Pi * 19K$ radians per second (19 Khz).

FIG. 1 illustrates a frequency spectrum of a typical FM stereo composite signal showing the components of Equation 1. The components include a sum of the left and right channel signals covering a 15 Khz bandwidth from DC to 15 KHz and the difference of the left and right channels modulated to and centered about a 38 Khz suppressed stereo subcarrier signal, with upper and lower sidebands spanning a 30 KHz bandwidth. Additionally the composite signal fm(t) signal includes a 19 KHz tone signal, commonly referred to as the pilot signal which is used as a reference signal for the radio receiver. The composite signal may also contain subsidiary signals in the 53 Khz to 75 KHz bandwidth, such as a subsidiary communication authorization (SCA) signal. These signals are excluded from FIG. 1 for clarity.

The composite signal fm(t) must be separated into left and right channels ("decoded") in order to reproduce the broadcast message in stereo. This requires extracting from the composite signal the values of the left channel and the right channel signals, l(t) and r(t) respectively of Equation 1 in isolation from the other components of the composite signal.

One analog method of decoding involves first passing the composite stereo through a low pass filter to remove the subsidiary signals, such as the SCA signal, leaving only the basic stereo signal. The basic stereo signal is then mixed with the 38 KHz subcarrier with one resulting component being one sideband of the (L-R) signal translated down to baseband. The pre-mixing basic stereo signal and the stereo signal mixed with the stereo subcarrier are in parallel passed through a low pass filter and then to a summing circuit and a subtracting circuit, the summing circuit adding the two signals together and the subtracting circuit subtracting the mixed signal from the unaltered basic stereo signal. One of the resulting components from the summation is 2R(t) (i.e. twice the time varying value of the right channel component). As a result of the subtraction, one of the resulting components is 2l(t) (i.e. twice the time varying value of the left channel component). The right and left channel information is then easily extracted by filtering out the remaining components resulting from the mixing, summation and subtraction operations. This analog approach is well known in the art and is susceptible to all of the disadvantages inherent with analog signal processing such, problems with noise, drift with temperature, and overall circuit complexity.

One digital decoding approach which overcomes the disadvantages inherent with analog decoding circuitry involves converting from the analog to the digital domain the composite FM stereo signal output from the FM discriminator. In this instance, the 38 Khz modulated portions of composite signal are sampled at selected points when the term [sin2$\omega_p$] (or alternatively sin$\omega_{sc}$, where $\omega_{sc}$ is the angular frequency of the subcarrier, typically 38 KHz) in Equation 1 is equal to plus or minus one (the ninety degree points on the stereo subcarrier) such that the composite signal is equal to either twice the left channel (2l) or twice the right channel (2r). The left and right channel information can then be easily extracted. The substantial difficulty with this approach is that, if the samples vary from the ninety degree points on the subcarrier, the sine of the subcarrier signal will not equal plus or minus one and a given sample will not represent a signal which is essentially purely right channel information or purely left channel information; the result is a deterioration in channel separation. One means of overcoming this problem is to use a voltage controlled oscillator feedback path to phase lock the sampling frequency to the pilot signal frequency. The 19 KHz pilot signal is then used to determine when sampling of the 38 KHz modulated information will occur. This method however requires substantially complex and costly hardware to implement.

Thus, the need has arisen for improved devices, systems and methods for decoding composite signals. Such devices, systems and methods would overcome the substantial technical disadvantages inherent with currently available analog decoding means and the substantial cost and complexity disadvantages inherent with currently available digital decoding means.

SUMMARY OF THE INVENTION

According to the invention, a method of decoding a composite signal is provided which includes receiving a composite signal including a pilot signal at a pilot signal frequency and first and second information modulated with a subcarrier at a harmonic of the pilot frequency. The received composite signal is sampled at a preselected sampling frequency. The sampled composite signal is mixed with a reference signal of approximately the same frequency as the pilot. The mixed down pilot signal is extracted from the mixed down composite signal, the amplitude and sign of the mixed down pilot signal proportional to the phase difference between the pilot signal and the reference signal. The phase of the reference signal is adjusted as a function of the amplitude of the mixed down pilot signal such that the reference signal is approximately 90° out of phase with the received pilot signal. The sample of the composite signal taken closest to the start of the period of the pilot signal is identified. Samples representing substantially the first and second information are selected from the samples of the composite signal taken at points in time when the sine of the phase angle of the composite signal is substantially plus and minus one, the points in time determined from the sampling frequency and the samples of the composite signal taken closest to the start of each period of the pilot signal.

The present invention provides significant advantages over previously available composite signal decoding methods, circuits and systems. The present invention overcomes the substantial technical disadvantages inherent with currently available decoding means, such as problems with noise, drift with temperature and overall circuit complexity. Further, the present invention overcomes the significant cost and complexity disadvantages inherent with currently available digital composite signal decoding means.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 2–6 of the drawings, like numerals being used for like and corresponding parts of the various drawings.

Figure 1:
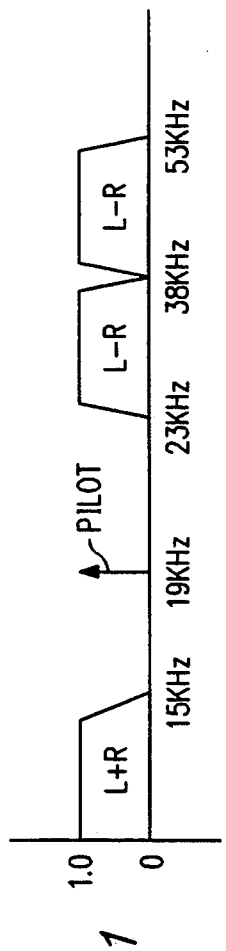
FIG. 1 is a frequency spectrum representative of a typical FM stereo composite signal.
Figure 2:
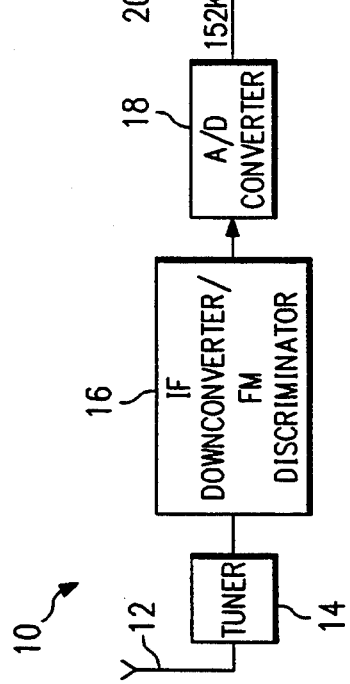
FIG. 2 is a block diagram of a stereophonic radio system according to a preferred embodiment.

The present invention is illustrated in a stereo radio receiving system shown generally at 10 in FIG. 2. Stereo receiver 10 includes an antenna 12 which receives radio frequency broadcasts carrying the composite FM signal which is to be demodulated and decoded. A tuner 14 is coupled to antenna 12 which selects the frequency band of the desired station and rejects all other frequencies. An intermediate frequency (IF) downconverter/FM discriminator 16 is coupled to tuner 14. As is known in the art, downconverter/discriminator 16 down converts the frequency of the selected band from the radio frequency (RF) range to an intermediate frequency (IF) band. Downconverter/discriminator 16 then extracts the encoded signal whose spectrum is shown in FIG. 1 by stripping away the carrier.

In the illustrated embodiment, the encoded stereo signal is next passed to an analog-to-digital converter 18 which samples the encoded stereo signal of FIG. 1 at a sampling frequency of 152 KHz. At this selected sampling frequency or rate, each period of the information channels modulated at 38 KHz is sampled four times and each period of the pilot signal at 19 KHz is sampled eight times.

The digitized composite signal is next passed to digital signal processor 20 for decoding the composite FM signal and extracting the left and right channel information. Digital signal processor 20 may be, for example, a Texas Instruments TMS320 family digital signal processor available from Texas Instruments Incorporated.

For a complete description of the TMS320 family of digital signal processors, reference is now made to the following United States patents, assigned to the assignee of the present application, and incorporated herein by reference: U.S. Pat. No. 4,577,282 to Caudel et al. for "Microcomputer System for Digital Signal Processing"; U.S. Pat. No. 4,713,748 to Magar et al. for "Microprocessor with Block Move Instruction"; U.S. Pat. No. 5,099,417 to Magar et al. for "Data Processing Device with Improved Direct Memory Access"; and U.S. Pat. No. 5,072,418 to Boutaud et al. for "Series Maximum/Minimum Function Computing Devices, Systems and Methods".

The preferred embodiments of the present invention is realized in the method of programing digital signal processor 20, and therefore, the sub-blocks within block 20 of FIG. 2 depict functions implemented in software. In alternate embodiments, these functions may be realized in whole or in part by equivalent hardware. The preferred embodiments are further described on a step by step basis in the flow charts of FIGS. 3a-3l.

Figure 3A:
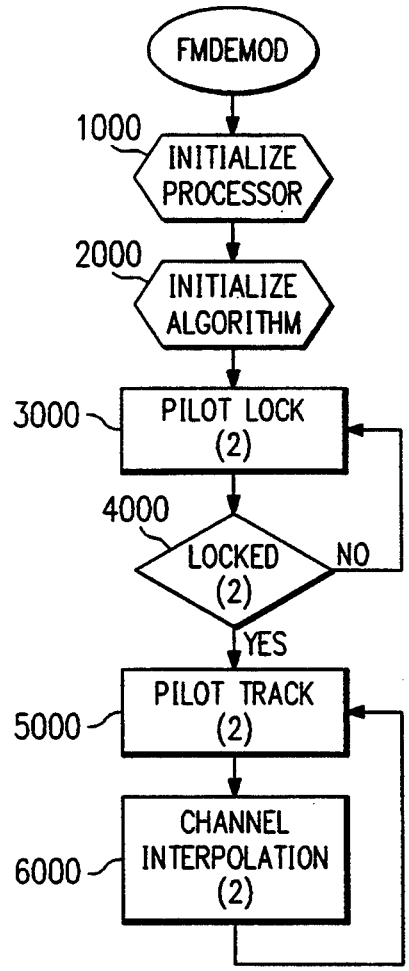
FIGS. 3a-3l are a complete set of flow charts describing a method of decoding a composite signal according to the preferred embodiment.

Following system initialization (steps 1000 and 2000, FIG. 3a), the first stage of the decoding process is to lock onto the pilot signal portion of the FM composite signal (step 3000, FIG. 3a). Since the stereo subcarrier frequency is twice the pilot signal frequency, by knowing the starting point of each period of the pilot signal, a determination can be made of which samples of the composite signal received from analog-to-digital converter 18 are closest in time to those points on the stereo subcarrier where the sine is plus or minus one (i.e., the 90 and 270 degree phase points for each period of the subcarrier). At these points on the subcarrier, the data is the closest to containing all left channel or all right channel information. An interpolation can then be made to predict the value of the stereo composite signal at those times when the sine of the stereo subcarrier is essentially equal to plus or minus one. Advantageously, according to preferred embodiments of the present invention, A to D converter 18 can be allowed to sample asynchronously of signal processor 20, eliminating the need for expensive phase lock loop circuitry including the requisite voltage controlled oscillator.

Locking onto the pilot signal is performed by phase locking and tracking functions 22 (step 3000, FIG. 3a). Initially, eight new samples received from A/D inverter 18 are read into a data table (steps 3100–3300, FIG. 3b). The digital data received from analog-to-digital converter 18 are then mixed with a referenced signal at substantially 19 KHz, provided by reference signal generation function 24, by mixing function 26 (step 3400, FIG. 3b). In the illustrated embodiment, the reference signal is generated from a 128 point cosine wave stored in cosine table 28 by taking eight entries spaced sixteen points apart. In alternative embodiments, the total number of points in the cosine wave, the number of entries used and the spacing may be varied depending on the sampling and the desired resolution. Consequently, in the illustrated embodiment, mixing function 26 operates as an eight-point digital mixer. The output of mixing function 26 is passed through a low-pass antialiasing filter 30 and then to an 8 to 1 decimator function 32 (step 3400, FIG. 3b). Decimator function 32 reduces the processing rate from 152 KHz to 19 KHz thereby providing an error signal at the rate of once per pilot period. The decimated signal representing the phase error of the pilot is then passed through a loop filter 34 (step 3500, FIG. 3b) which passes only the pilot signal portion which has been modulated down to D.C. of the post mixing/post decimation composite signal. The output of the loop filter represents the phase error between the pilot signal and the reference signal. As discussed further below, since the reference signal is at substantially the same frequency as the pilot signal (i.e. 19 KHz), when the output of the loop filter goes below a selected threshold, the signals are approximately 90° out of phase, and the amplitude and sine output of loop filter 34 are proportional to the remaining phase difference.

Figure 3B:
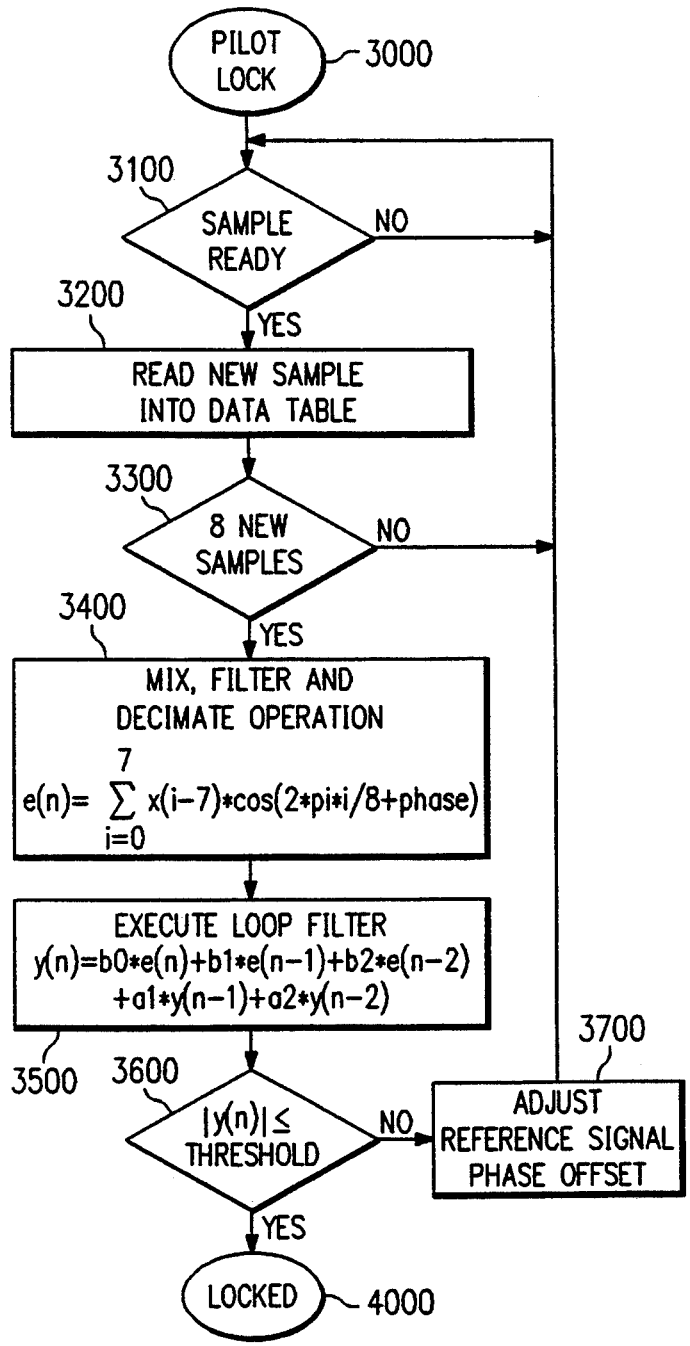
Figure 3C:
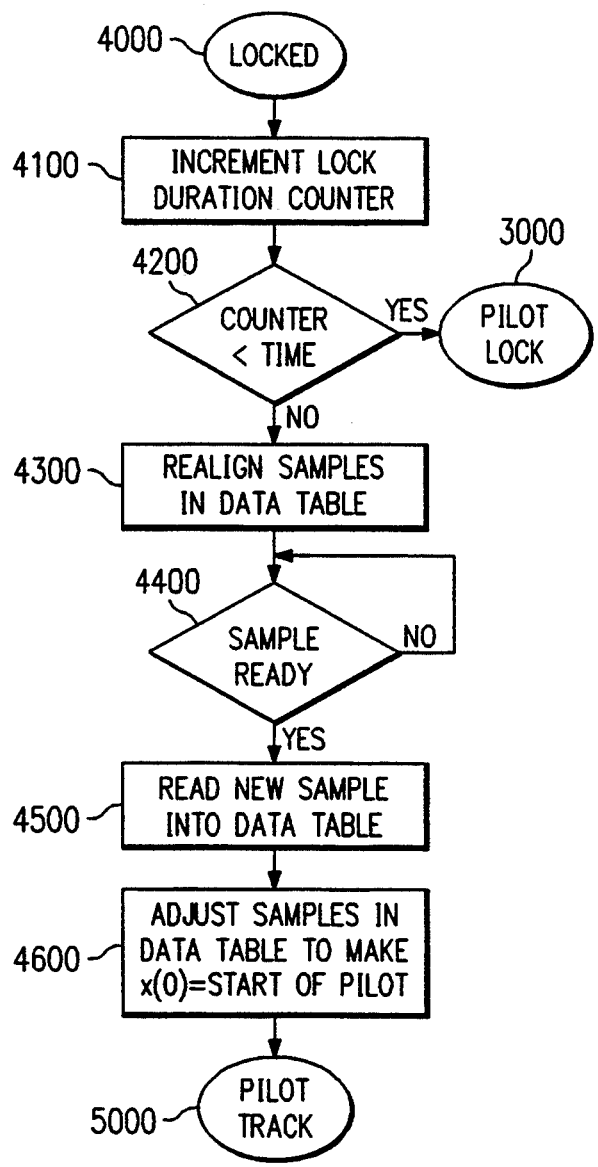
Figure 3D:
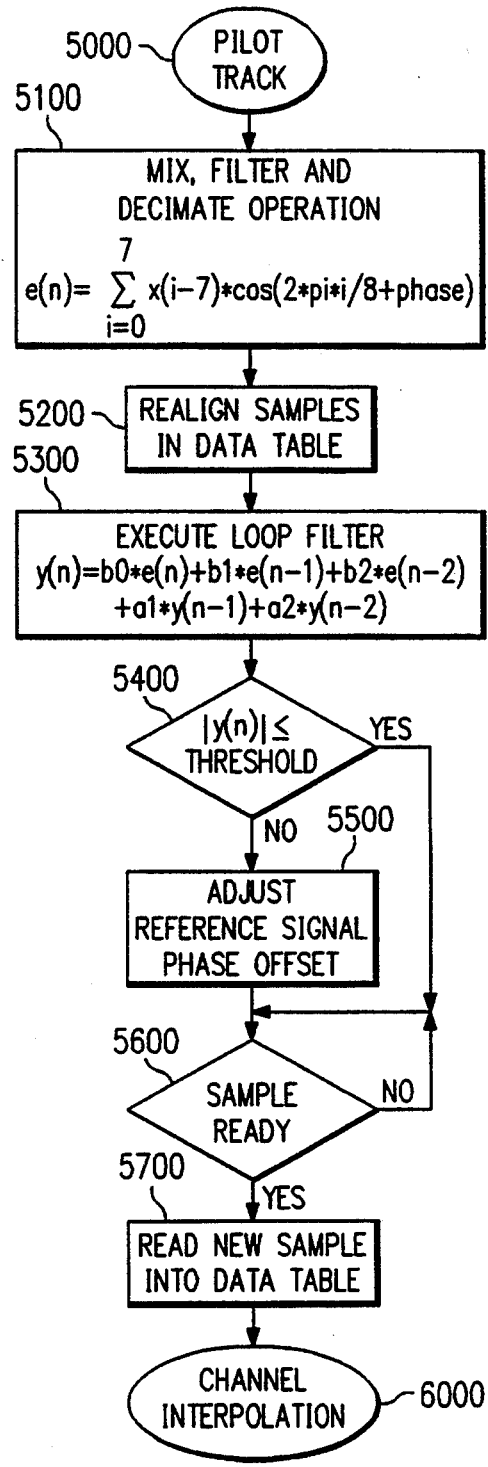

Digital signal processor identifies the samples of the incoming signal from A to D converter 18 taken closest to the actual start of each pilot signal period (steps 3600–3700, FIG. 3b). Digital signal processor 20 performs this task by adjusting the phase of the reference signal by iteratively modifying the pointer to cosine table 28 until the reference signal is substantially 90° out of phase with the pilot signal. With a 128 point reference signal and using eight points per period spaced 16 points apart, an adjustment resolution of 2.8125° on the reference signal is achieved. In alternate embodiments, where the total number of points in the cosine wave and the spacing are varied, the resolution will be correspondingly varied. Digital signal processor 20 iteratively aligns the eight points of each period of the reference signal with the eight samples being held in the data table until the output from loop filter 34 falls below a selected threshold. Since the phase angle of the pilot signal at the zero crossing on the upward slope is taken as zero degrees, when the cosine reference signal is approximately ninety degrees out of phase with the pilot signal, mixing the data sample of the eight samples held in the data table corresponding closest to the zero crossing with the reference signal results in minimal output from the filter function 34 in accordance with the Equation 2:

$$\sin x \cos y = \frac{1}{2} [\sin(x + y) + \sin(x - y)] \quad (2)$$

The locking process (step 3000, FIG. 3a, and steps 3100–3700, FIG. 3b) is repeated for a preselected number pilot signal periods to insure that the pilot lock is accurate (step 4000, FIG. 3a). Multiple iterations of the pilot locking routine accounts for a false lock which may occur due to delays through phase locking and tracking functions 34, especially loop filter 34. This procedure is implemented in the preferred embodiment by incrementing a counter and looping back until enough samples falling below the threshold have been taken (steps 4100–4200, FIG. 3c).

Once digital signal processor 20 has identified the samples of the incoming composite signal having the closest correspondence with the start of each pilot period (time x(0)), digital signal processor can then interpolate the selection of data points from those samples. The existing samples in the data table are then realigned (pushed down) to make room for an additional sample and an additional sample read in steps 4300–4500, FIG. 3c. (Data continues to be received from A/D converter 18 during processing.) The samples are adjusted in the data table to the sample identified as being closest to the start of the current pilot period represents time x(0) (step 4600, FIG. 3c).

In addition to locking onto the pilot signal and interpolating accordingly, provision must be made to track the pilot signal as the phase error changes (step 5000, FIG. 3a). The tracking function will be discussed further below in conjunction with the discussion of the channel interpolation operations (step 6000, FIG. 3a).

Figure 4:
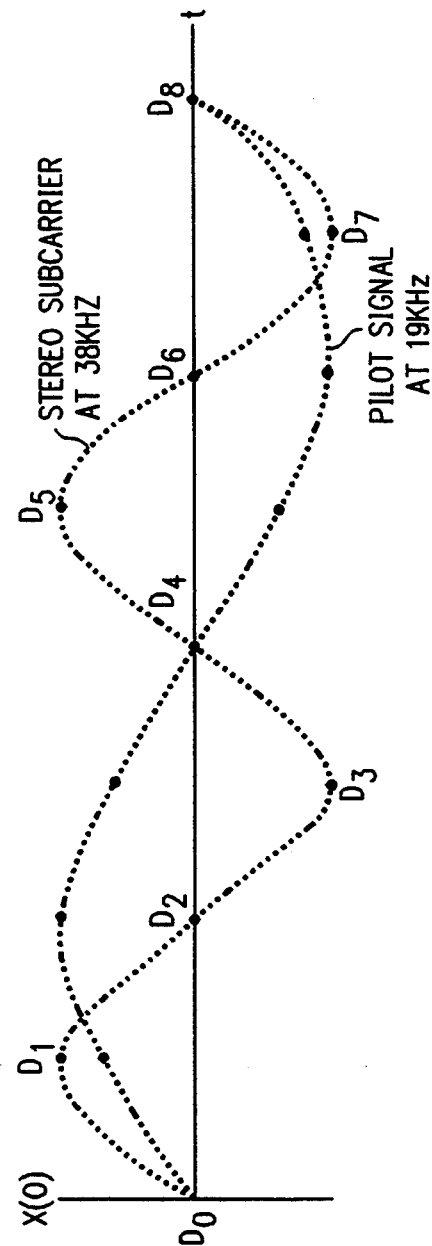
FIG. 4 is a waveform diagram depicting the idealized relationship between the pilot signal and the stereo subcarrier in the digital domain.

FIG. 4 depicts the ideal case in which analog-to-digital converter 18 sampled the incoming composite signal almost exactly at start of a new period of the pilot signal (time x(0)), and the reference signal and the pilot signal sample exactly aligned during mixing. In the ideal case shown in FIG. 4, digital signal processor 20 simply takes data points D1, D3, D5 and D7 (the 90 and 180 degree points on the subcarrier) based on their separation in time from the start of the period of the pilot signal (point D0 representing time x(0)). The ideal case in FIG. 4 will not always occur, first, because A to D converter may not have sampled the composite signal at a point almost exactly in time with the start of a new period of the pilot signal, and second, because the frequency of the pilot signal and the reference signal will not always completely correspond thereby adding phase error into the determination of the starting point of each period of the pilot signal. In the usual case therefore, digital signal processor 20 must interpolate from the data samples of the digitized FM composite signal to obtain closer estimates of the actual data values at the points where the sine of the stereo subcarrier is plus or minus one.

Figures 6, 7:
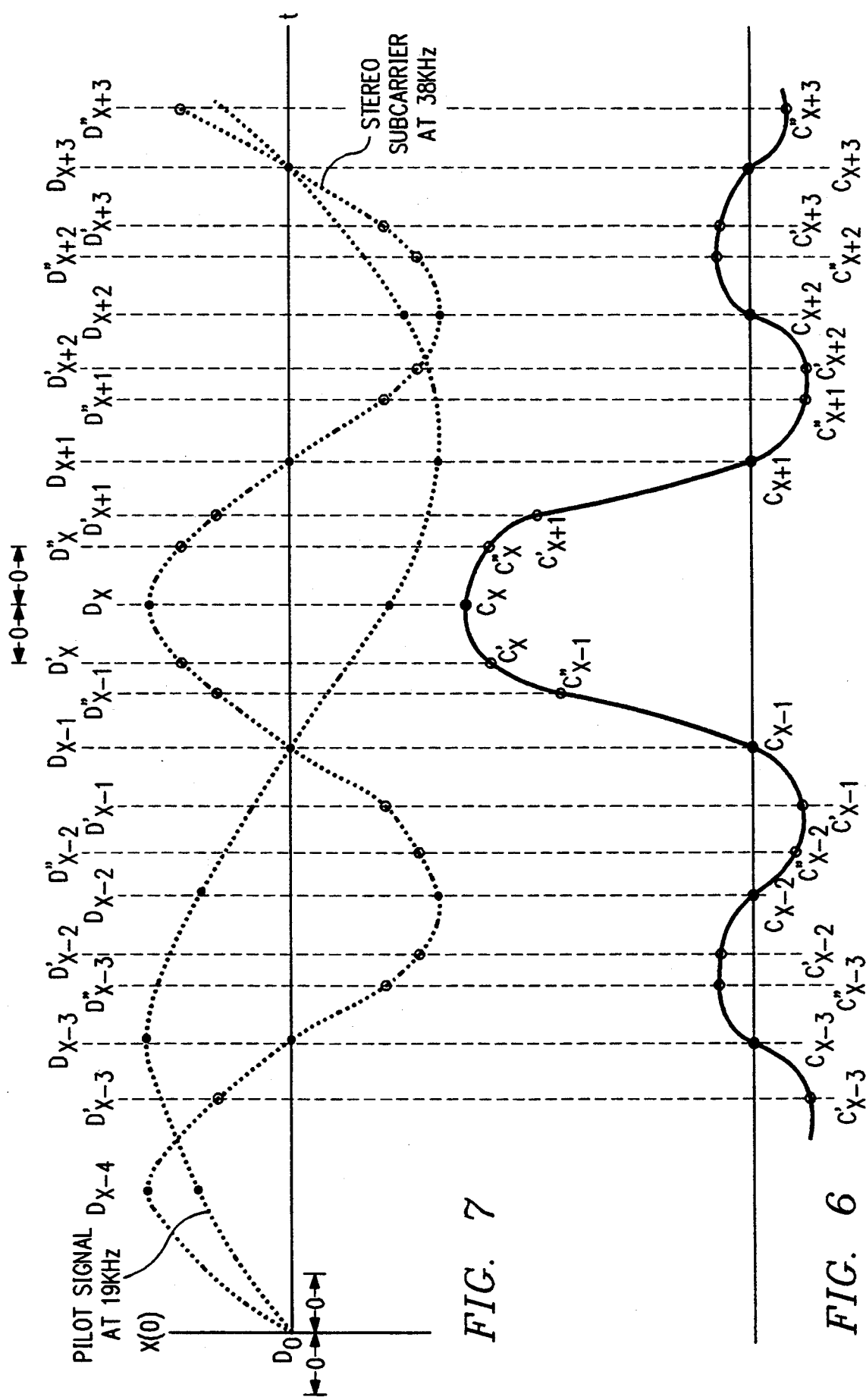
FIG. 6 is a geometric curve representing an example of a series of interpolation filter coefficient sets according to an embodiment of the present invention.
FIG. 7 is a waveform diagram depicting the relationships between the pilot signal and the stereo subcarrier in the ideal case and in example cases subject to phase error.

Digital signal processor 20 uses interpolator/sampler function 36 and its associated coefficient table 38 to interpolate based on the phase error signal output from loop filter 34. A functional diagram of interpolator/sampler 36 is given in FIG. 5 and a depiction of selected sets of the coefficients stored in coefficient table 38 is given in FIG. 6. The coefficients generally follow the form of a sin x/x curve. In FIG. 6, three sets of seven coefficients each (the C set, the C' and the C" set) are depicted for clarity. In the preferred embodiment, there are sixteen sets of seven coefficients disposed along the curve. In alternate embodiments, more or less coefficients may be used depending on the desired resolution (the reference cosine table resolution should match the interpolation coefficient table resolution.

Referring next to FIG. 7, a portion of the composite signal is shown following sampling by A to D converter 18. For illustration purposes, the extraction and interpolation of the data of sample $D_x$ (or $D'_x$, $D''_x$ depending on the phase error) will be used as a reference. For each pilot period, two periods of the 38 KHz subcarrier occur such that four decoding/interpolation operations occur during each processing cycle. In addition to interpolating at point $D_x$ in the present example, interpolation of the data samples at points $D_{x+2}$, $D_{x-2}$ and $D_{x-4}$ are also taken during the cycle defined by the current pilot period. In this example, the interpolation of data samples $D_{x-2}$ and $D_{x-4}$ has already occurred, and the samples in the data table realigned with the coefficient set to interpolate data $D_{x+1}$. In the ideal case, the output of loop filter 34 will approximate 0, and interpolator/sampler 36 correspondingly selects the $C_x$ series of coefficients. Interpolator/sampler 36 then takes sample $D_{x-3}$ and multiplies it by coefficient $C_{x-3}$; multiplies sample $D_{x-2}$ by coefficient $C_{x-2}$; multiplies sample $D_{x-1}$ by coefficient $C_{x-1}$; multiplies sample $D_x$ by sample $C_x$; multiplies sample $D_{x+1}$ by coefficient $C_{x+1}$ multiplies sample $D_{x+2}$ coefficient $C_{x+2}$; and multiplies sample $D_{x+3}$ by coefficient $C_{x+3}$. The sum of the "partial" products of the data points and the coefficients is then taken with the result being an interpolated value essentially representing pure left or right channel data. In the example of FIG. 6, sample $D_x$ corresponds to a point on the subcarrier having a sine of plus one, and therefore represents left channel data.

When point D0, the sample closest to the starting point of the period of the pilot signal, does not actually correspond to the true starting point of the period of the pilot signal, then the samples of the composite signal received at the input to interpolator/selector 36 will also contain a phase error. In this case, the non-zero output of loop filter 34 will be used by interpolator/sampler 36 to select an alternate set of coefficients. In the example shown in FIG. 6, if the sample closest to the start of the period of the pilot signal precedes the actual start of the period of the pilot signal by a phase angle $\theta$, then a desired sample will correspondingly precede the actual point on the FM composite signal where the sine of the stereo subcarrier is equal to plus or minus one. In the example of FIG. 6, when the closest sample to the start of the pilot signal precedes the actual start of the pilot signal period by a phase angle $\theta$, the resulting sample closest to data point $D_x$ will be $D'_x$. Hence, an interpolation must be made to estimate the value at point $D_x$ where the sine of the subcarrier is actually plus one. In this case, coefficient set $C'$ (i.e., coefficients $C'_x$, $C'_{x+1}$, $C'_{x+2}$, $C'_{x+3}$, $C'_{x-2}$ and $C'_{x-3}$) is selected, and the multiplication and addition process discussed above performed on the $D'$ data points (i.e., $D'_x$, $D'_{x+1}$, $D'_{x+2}$, $D'_{x+3}$, $D'_{x-1}$, $D'_{x-2}$ and $D'_{x-3}$ to extract essentially pure channel data. Similarly, when the closest sample trails at the actual start of the period of the pilot signal, then the actual sample of the composite signal will trail the point on the composite signal where the sine is equal to plus or minus one. In the example of FIG. 6, where $D_x$ is the data value at the exact point where the sine is plus one, and the sample closest to the start of the pilot signal trails by a phase angle $\theta$, the actual data sample received from analog-to-digital converter 18 corresponds to point $D''_x$, and hence interpolation can be necessary to determine the actual value at point $D_x$. In this case, interpolator/sampler 36 uses coefficient set $C''$ (i.e., coefficients $C''_x$, $C''_{x+1}$, $C''_{x+2}$, $C''_{x+3}$, $C''_{x-1}$, $C''_{x-2}$ and $C''_{x-3}$) to estimate the actual data value at point $D_x$ using the method described above on data points $D''$ (i.e., $D''_x$, $D''_{x+1}$, $D''_{x+2}$, $D''_{x+3}$, $D''_{x-1}$, $D''_{x-2}$ and $D''_{x-3}$).

Two sample periods following the interpolation of the data sample at point $D_x$, the data samples in the table for the current cycle are realigned with the coefficients and extraction/interpolation at point $D_{x+2}$ is performed. After interpolation at point $D_{x+2}$, point $D_{x+2}$ being the last 90°/180° point on the subcarrier within the current period, processing continues with tracking the pilot to set up a new cycle (discussed further below).

Figure 3E:
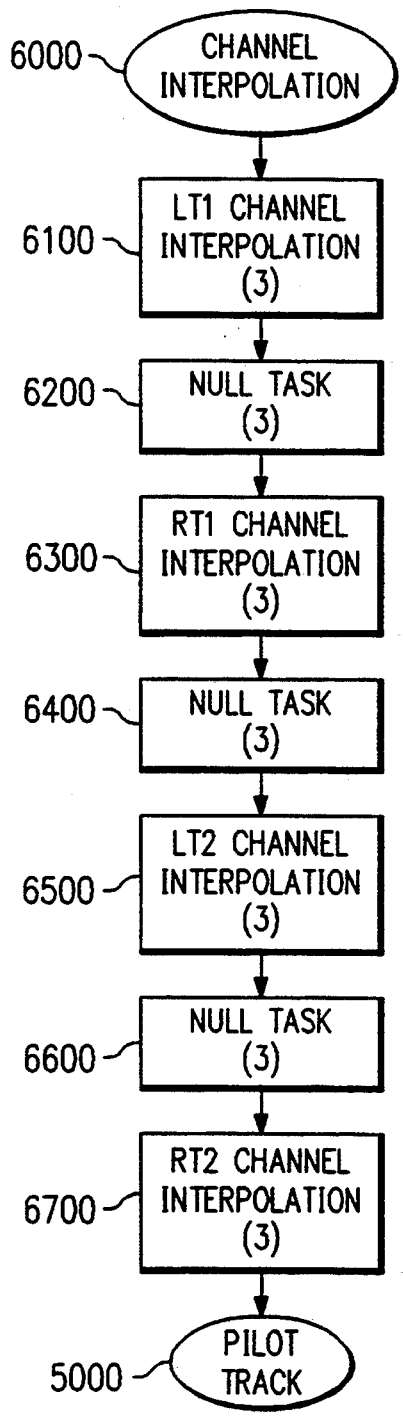

The decoding interpolation operations generally follow the routine depicted in FIG. 3e. More detailed descriptions of the individual tasks shown in FIG. 3e are depicted in FIGS. 3f–3l. During each cycle, left channel information is extracted at steps 6100 and 6500, while right channel information is alternately extracted at steps 6300 and 6700. Since data samples are continuously being provided to processor 20 from A/D converter 20, during each decoding/interpolation task (steps 6100, 6300, 6500 and 6700, FIG. 3e), and during each null task (steps 6200, 6400 and 6600, FIG. 3e), a new data sample is read into the data table. At the end of each cycle, the processing is looped back to the pilot track routine as step 5000.

Figure 3F:
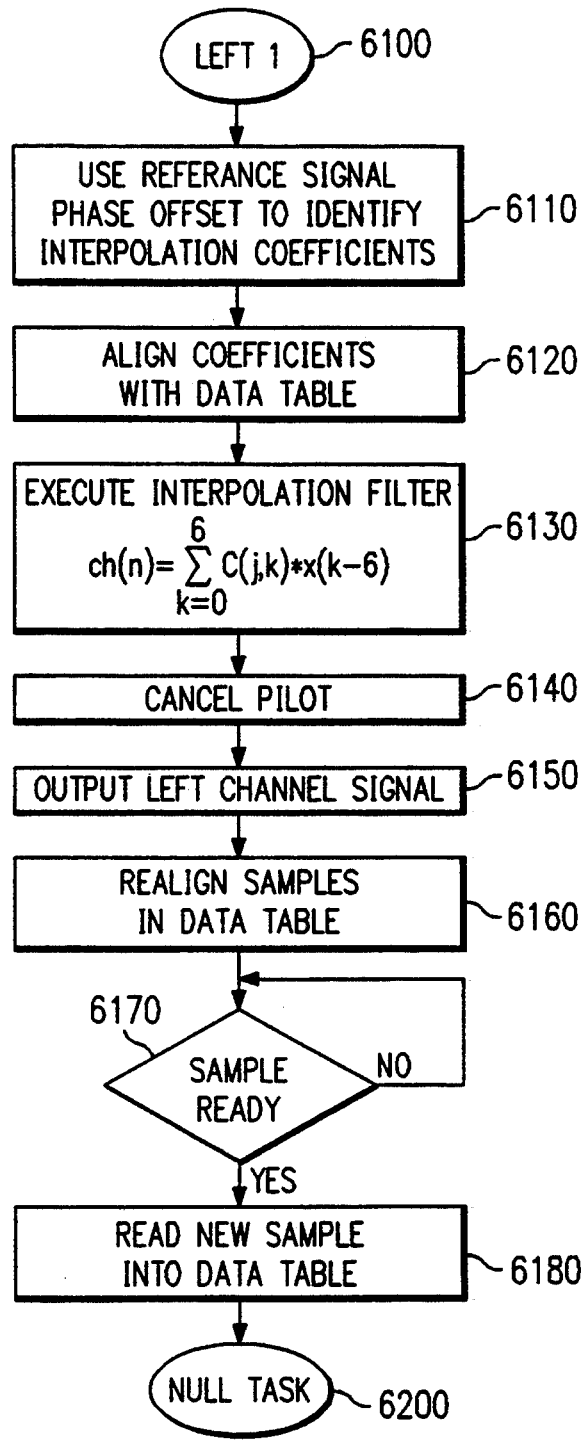

Referring to FIG. 3f, the first left channel decoding-/interpolation operation begins by using the phase error signal output from loop filter 34 to select a set of interpolation coefficients (step 6110) being held in coefficient table 38. The coefficients are then aligned with the data table at step 6120, and the interpolation performed at step 6130 by interpolation/sampler function 36 (FIG. 2). At step 6140, the pilot signal is extracted from the composite signal by pilot cancelling function 40 (FIG. 2) and at step 6150 essentially pure left channel signal is output. At step 6160, the data samples in the data table are realigned to make room for new data sample from A to D converter 18 (FIG. 2). When a new sample becomes ready at step 6170, that new sample is read into the data table at step 6180.

Figures 3G, 3H:
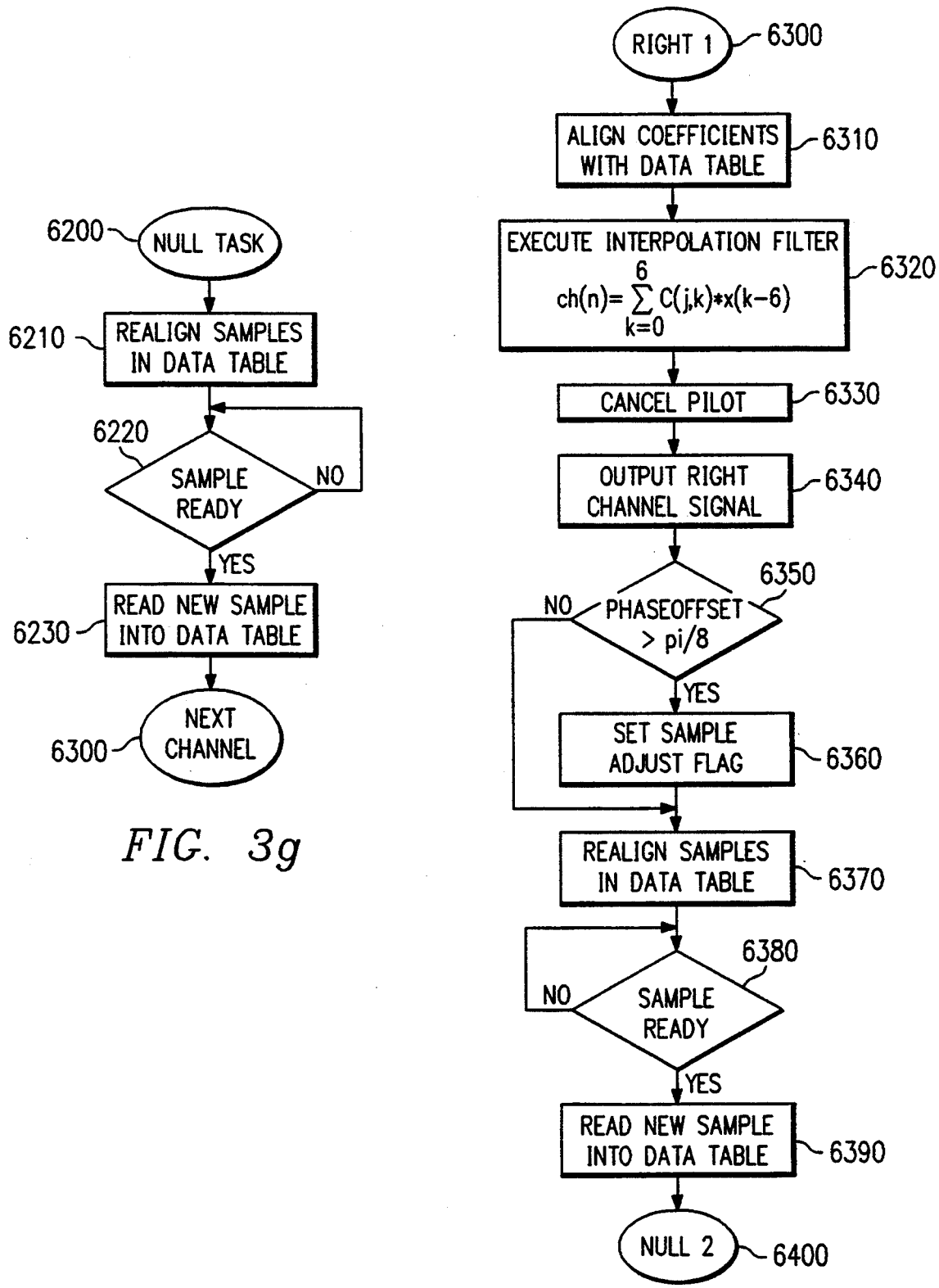

In FIG. 3g, the first of the null tasks is depicted (step 6200, FIG. 3e). At step 6210, the samples are realigned in the data table to make room for a new sample. When the sample is ready at step 6220, the new sample is read into the data table. The processing then proceeds to the first right channel decoding/interpolation operation (step 6300 in FIG. 3e).

Referring next to FIG. 3h, the first right channel decoding/interpolation operation is generally depicted. At step 6310, the interpolation coefficients previously identified at steps 6110 during the first left channel decoding/interpolation operation are aligned with the data table. As with the left channel decoding/interpolation operation, at steps 6320–6340, the interpolation is performed as discussed above, the pilot signal cancelled out, and the essentially pure right channel information extracted. At step 6350, a test is performed to determine if the "phase error" signal from loop filter 34 (FIG. 2) exceeds $\pi/8$. If the phase offset at step 6350 exceeds $\pi/8$, then a sample adjust flag is set at step 6360. Otherwise, the processing continues without the sample adjust flag set. At steps 6370–6390, the data samples are realigned in the data table to make room for a new sample, and when the new sample is ready, the new sample is read into the data table. The routine continues at step 6400 with the second null task.

Figure 3I:
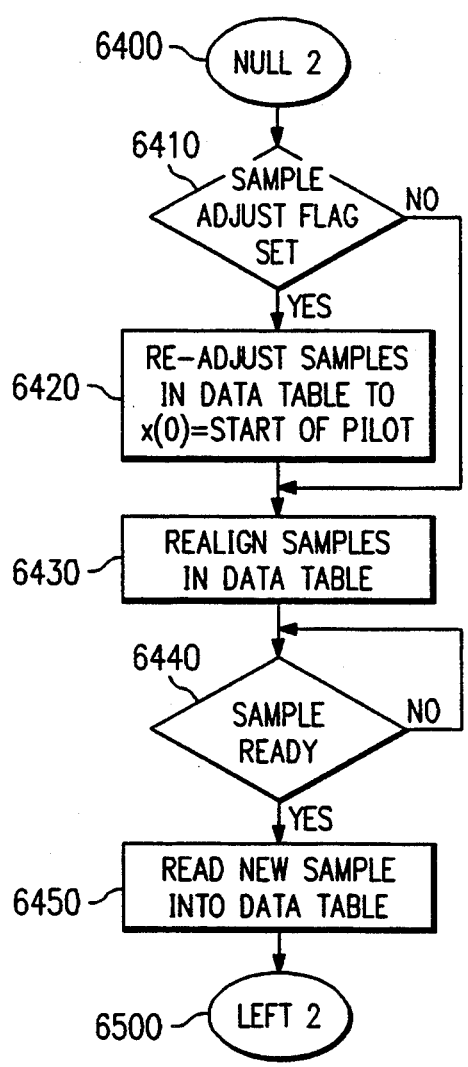

Referring next to FIG. 3i, the second null task depicted at step 6400 in FIG. 3e is shown in further detail. At step 6410, a determination is made as to whether or not the sample adjust flag was set previously at step 6360. If the sample adjust flag has been set, then the samples in the data table are readjusted such that the start of the pilot corresponds to time x(0). Otherwise, processing continues to step 6430. During the second null task at steps 6430–6450, the samples in the data table are realigned to make room for a new data sample, and when the new data sample is ready, it is read into the data table.

Figure 3J:
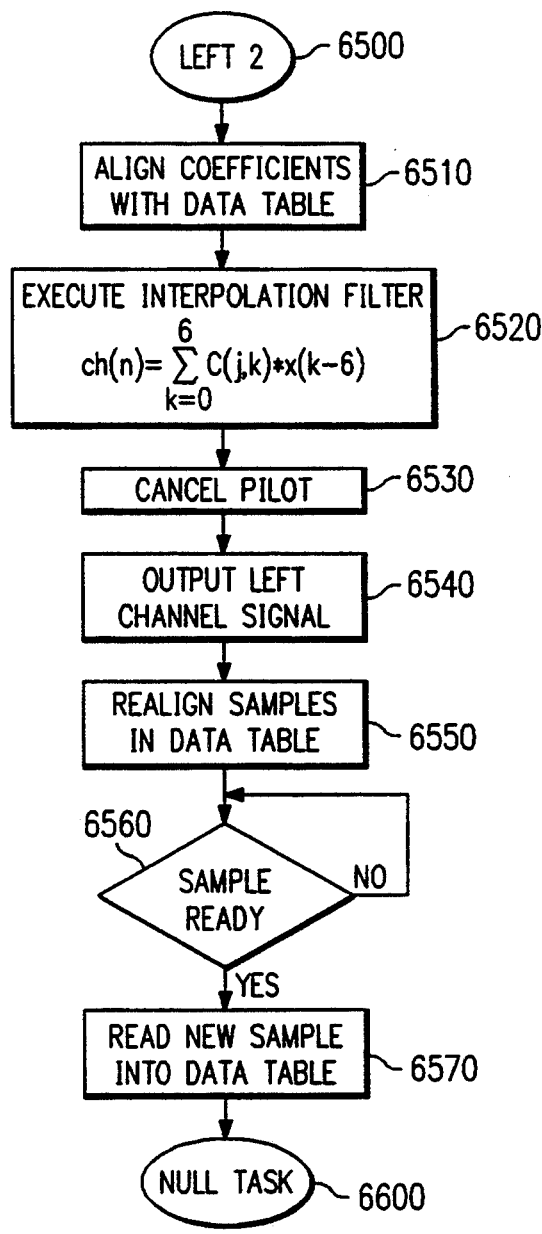
Figures 3K, 3L:
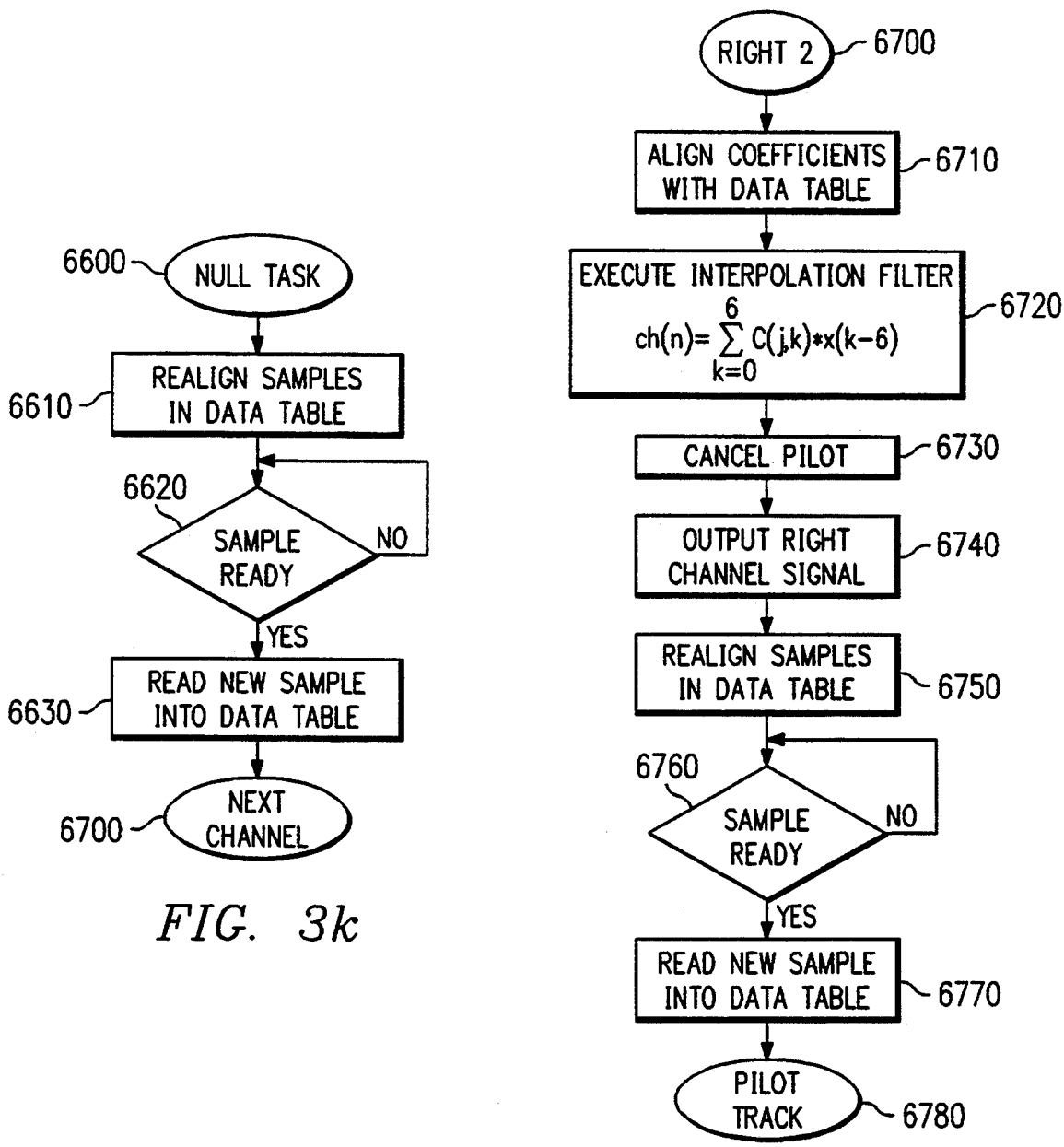
Figure 5:
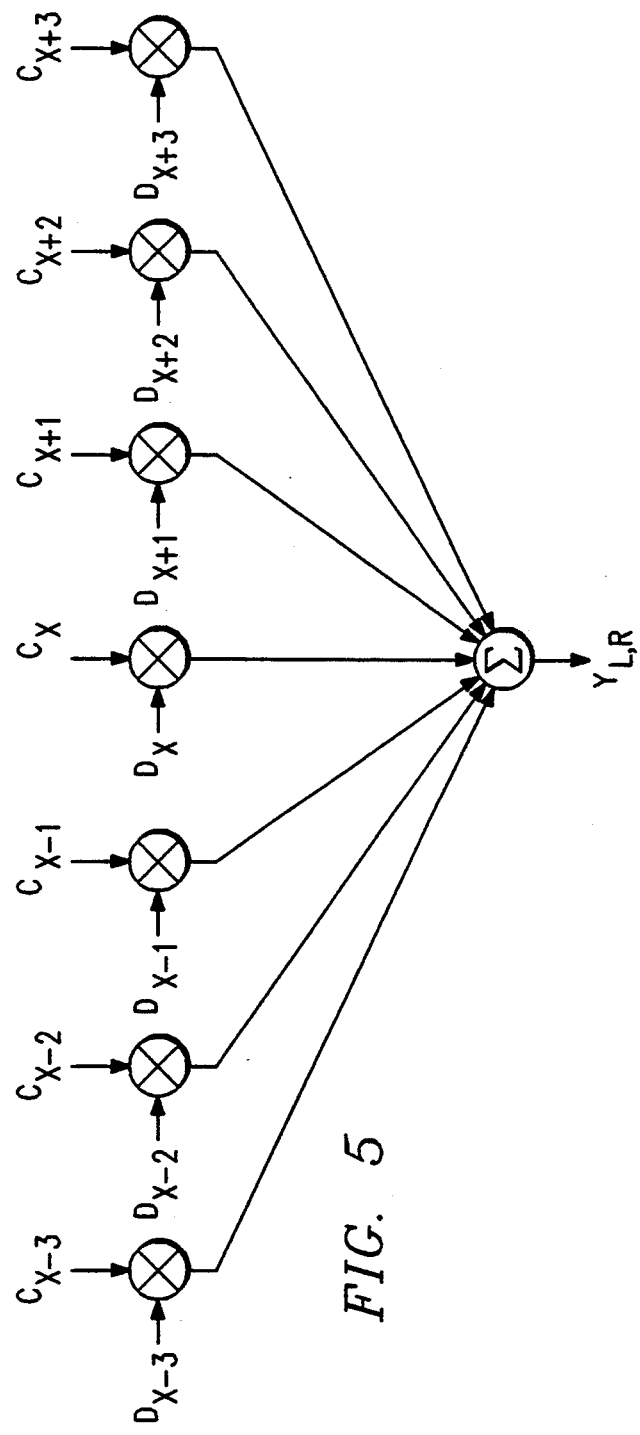
FIG. 5 is a functional diagram of an interpolation filter according to an embodiment of the present invention.

Referring next to FIG. 3j, the second left channel decoding/interpolation operation shown generally at step 6500 in FIG. 3e is depicted in further detail. The tasks identified at steps 6510–6570 correspond to tasks 6120–6180 of the first left channel decoding/interpolation operations depicted in FIG. 3f and discussed above. Similarly, steps 6610–6630 in FIG. 3k, describing the null task step 6600 in FIG. 3e, correspond to steps 6210–6230, previously discussed in connection with FIG. 3g. Finally, steps 6710–6770 depicted in FIG. 3l, further describing the second right channel decoding- /interpolation operation at step 6700 of FIG. 3e correspond to steps 6310–6390 of FIG. 3h, detailing the analogous first right channel decoding/interpolation operation.

At the end of the decoding/interpolation of the four relevant samples of the subcarrier falling within the current pilot, a processor 20 loops back to track the pilot by identifying the sample taken closes to the start of the next pilot (step 5000, FIG. 3a). The pilot tracking step set forth in detail in FIG. 3d and is analogous to the pilot lock step. During steps 5100–5500 processor again performs the mixing, filtering, and decimation operations and a check made to determine whether the error signal output from the loop filter function exceeds the selected threshold. If the error signal exceeds the threshold, then the reference signal phase offset is again adjusted. Otherwise the system awaits the next sample. At steps 5600–5700, a new data sample is brought into the data table after which processing returns to the channel interpolation routines (step 6000, FIG. 3a).

Although the present invention and its advantages have been described in detail, it should be understood that various changes, substitutions and alterations can be made herein without departing from the spirit and scope of the invention as defined by the appended claims.

What is claimed is:

1. A method of decoding a composite signal comprising the steps of:
   receiving a composite signal including a pilot signal at a pilot signal frequency and first and second information modulated with a subcarrier, said pilot signal frequency being a subharmonic of a frequency of said subcarrier;
   sampling the composite signal at a sampling frequency;
   mixing down the sampled composite signal with a reference signal of approximately the same frequency as the pilot signal;
   extracting the mixed down pilot signal from the mixed down composite signal, the amplitude and sign of the mixed down pilot signal proportional to the phase difference between the pilot signal and the reference signal;
   adjusting the phase of the reference signal as a function of the amplitude and sign of the mixed down pilot signal such that the reference signal is approximately ninety degrees out of phase with the received pilot signal;
   identifying the samples of the composite signal taken closest to the start of each period of the pilot signal; and
   selecting samples representing the first and second information from the composite signal by selecting those samples of the composite signal taken at points closest in time to when the sine of the phase angle of the subcarrier is plus and minus one, the points in time being determined from the sampling frequency and the samples of the composite signal taken closest to the start of each period of the pilot signal.

2. The method of claim 1 further including the step of accounting for phase differences between the samples of the composite signal taken closest to the start of the period of the pilot signal and the actual start of the period of the pilot signal as a function of a set of coefficients selected from a plurality of sets of coefficients.

3. The method of claim 1 and further comprising the step of decimating the composite signal after said step of mixing to reduce the frequency of the samples of the composite signal.

4. The method of claim 1 wherein the sampling frequency is eight times the pilot signal frequency.

5. The method of claim 3 wherein said step of decimating reduces the frequency of the samples following mixing from the sampling frequency to the pilot signal frequency.

6. The method of claim 2 wherein the plurality of sets of coefficients approximate a sin x/x function.

7. The method of claim 2 wherein the set of coefficients is selected in response to the amplitude and sign of the mixed down pilot signal.

8. The method of claim 2 wherein said step of selecting comprises the steps of:
   selecting first samples of the composite signal which correspond closest in time to points on the subcarrier signal when the sine of the subcarrier signal is equal to plus one;
   selecting second samples of the composite signal which correspond closest in time to points on the subcarrier signal when the sine of the subcarrier signal is equal to minus one.

9. The method of claim 8 further including:
   multiplying each selected sample by a corresponding first coefficient from the selected set of coefficients to obtain a first partial product;
   for each selected sample, multiplying a previous sample of the composite signal by a corresponding second coefficient from the selected set of coefficients to obtain a second partial product;
   for each selected sample, multiplying a subsequent sample of the composite signal by a corresponding third coefficient from the selected set of coefficients to obtain a third partial product; and
   summing the first, second and third partial products.

10. Circuitry for decoding a digitized composite signal including a pilot signal at a pilot frequency and first and second information modulated with a subcarrier at a multiple of the pilot frequency, said digitized composite signal sampled at a sampling frequency, comprising:
    mixing circuitry operable to mix said digitized composite signal with a reference signal from a reference signal generator to provide a mixed down composite signal including a mixed down pilot signal;
    a filter for extracting said mixed down pilot signal, the amplitude and sign of the mixed down pilot signal proportional to the phase difference between the pilot signal and the reference signal;
    feedback circuitry coupling said mixed down pilot signal from said filter to said reference signal generator, said reference signal generator operable to adjust the phase of the reference signal as a function of the amplitude and sign of the mixed down pilot signal such that the reference signal is approximately ninety degrees out of phase with the received pilot signal;
    a decoder operable to identify the samples of the digitized composite signal taken closest to the start of each period of said pilot signal by identifying those samples when the amplitude and sign of said mixed down pilot signal is minimized; and
    said decoder operable to select samples of the digitized composite signal taken at points in time which are nearest when the sine of the phase angle of the subcarrier is plus and minus one, said points being determined based on said sampling frequency and said samples of the composite signals taken closest to the start of each period of said pilot signal.

11. The circuitry of claim 10 including an interpolation filter operable to correct for phrase differences between said samples of said composite signals taken closest to the start of each period of said pilot signal and the actual start of each period of said pilot signal as a function of a set of coefficients selected from a plurality of stored sets of coefficients, said set selected as a function of the amplitude and sign of the mixed down pilot signal received from said filter.

12. The circuitry of claim 11 wherein said interpolation filter is operable to:
select first samples of said digitized composite signal which approximate the points on the subcarrier signal when the sine of the subcarrier signal is equal to plus one;
select second samples of said digitized composite signal which approximate the points on the subcarrier signal when the sine of the subcarrier signal is equal to minus one.

13. The circuitry of claim 12 wherein said interpolation filter is further operable to process any selected sample by:
multiplying the selected sample by a corresponding first coefficient from the selected set of coefficients to obtain a first product;
multiplying a previous sample of the composite signal by a corresponding second coefficient from the selected set of coefficients to obtain a second product;
multiplying a subsequent sample of the composite signal by a corresponding third coefficient from the selected set of coefficients to obtain a third product; and
summing said first, second and third products.

14. The circuitry of claim 13 and further comprising a decimator coupling said mixed composite signal output from the mixing circuitry to said filter, said decimator operable to reduce a processing frequency of said samples of the mixed down composite signal from said sampling frequency to said pilot signal frequency.

15. The circuitry of claim 14 wherein said sampling frequency is eight times said pilot signal frequency.

16. The circuitry of claim 10 wherein said decoder further includes pilot cancellation circuitry operable to cancel components of said pilot signal contained within said first and second information.

17. The circuitry of claim 14 and further comprising a low pass filter coupling signals output from said mixing circuitry to said decimator.

18. A system for decoding a composite signal, including a pilot signal at a pilot signal frequency and first and second information modulated with a subcarrier at a harmonic of the pilot frequency, comprising:
an analog to digital converter operable to sample a received composite signal at a sampling frequency and provide a digitized composite signal in response;
a digital signal processor receiving and processing said digitized composite signal received from said analog to digital converter and operable to:
mix said digitized composite signal with a reference signal to provide a mixed down composite signal including a mixed down pilot signal translated from the pilot signal frequency to approximately zero frequency, the amplitude and sign of said mixed down pilot signal proportional to the phase difference between said pilot signal and said reference signal;
reduce the frequency of the samples of said digitized composite signal after mixing from said sampling frequency to said pilot signal frequency;
filter said mixed down pilot signal from said mixed down composite signal;
adjusting the phase of said reference signal as a function of the amplitude and sign of said mixed down pilot signal such that the reference signal is approximately ninety degrees out of phase with the received pilot signal, said signal processor identifying samples of said composite signal taken closest to the start of each period of said pilot signal by identifying those samples when the amplitude and sign of said mixed down pilot signal is within a preselected range of zero; and
select samples of the digitized composite signal representing points in time which are nearest when the sine of the phase angle of the subcarrier is plus and minus one, said points being determined by said digital signal processor based on said sampling frequency and said samples of the composite signals taken closest to the start of each period of said pilot signal.

19. The system of claim 18 wherein said signal processor is further operable to correct for phase differences between said samples of said composite signal taken closest to the start of each period of said pilot signal and the actual start of each period of said pilot signal as a function of a set of coefficients selected from a plurality of sets of coefficients stored in an associated coefficient table, said set selected as a function of the amplitude and sign of the mixed down pilot signal.

20. The system of claim 19 wherein said digital signal processor is further operable to process any selected sample by:
multiplying the selected sample by a corresponding first coefficient from the selected set of coefficients to obtain a first product;
multiplying a previous sample of the composite signal by a corresponding second coefficient from the selected set of coefficients to obtain a second product;
multiplying a subsequent sample of the composite signal by a corresponding third coefficient from the selected set of coefficients to obtain a third product; and
summing the first, second and third products.

* * * * *